(12) United States Patent
Liu et al.

(10) Patent No.: US 10,269,129 B2
(45) Date of Patent: Apr. 23, 2019

(54) COLOR ADJUSTMENT METHOD AND DEVICE

(71) Applicant: Xiaomi Inc., Beijing (CN)

(72) Inventors: Anyu Liu, Beijing (CN); Chuanshun Ji, Beijing (CN); Guosheng Li, Beijing (CN)

(73) Assignee: XIAOMI INC., Beijing (CN)

( * ) Notice: Subject to any disclaimer, the term of this patent is extended or adjusted under 35 U.S.C. 154(b) by 187 days.

(21) Appl. No.: 14/981,912

(22) Filed: Dec. 29, 2015

(65) Prior Publication Data

US 2016/0189399 A1 Jun. 30, 2016

(30) Foreign Application Priority Data

Dec. 31, 2014 (CN) .......................... 2014 1 0856684
Jan. 15, 2015 (CN) .......................... 2015 1 0020420

(51) Int. Cl.
*G06K 9/46* (2006.01)
*G06T 1/60* (2006.01)
(Continued)

(52) U.S. Cl.
CPC ............ *G06T 7/408* (2013.01); *G06K 9/4652* (2013.01); *G06K 9/4661* (2013.01); *G06T 1/60* (2013.01); *G06T 7/90* (2017.01); *G09G 3/2003* (2013.01); *G09G 5/02* (2013.01); *G06T 7/40* (2013.01); *G09G 5/06* (2013.01);
(Continued)

(58) Field of Classification Search
None
See application file for complete search history.

(56) References Cited

U.S. PATENT DOCUMENTS

| 6,650,337 B2 * | 11/2003 | Stradley | G09G 5/02 345/601 |
| 2003/0198401 A1 * | 10/2003 | Shimazaki | G09G 5/02 382/274 |

(Continued)

FOREIGN PATENT DOCUMENTS

| CN | 1160326 A | 9/1997 |
| CN | 1671214 A | 9/2005 |

(Continued)

OTHER PUBLICATIONS

Extended European Search Report from EPO dated May 3, 2016 for EP 15203246.

(Continued)

*Primary Examiner* — Yu-Jang Tswei
(74) *Attorney, Agent, or Firm* — Jun He Law Offices P.C.; James J. Zhu

(57) ABSTRACT

A color adjustment method and device are provided. The color adjustment method comprises: obtaining frame data from a frame buffer; mapping the frame data from an original color space to a linear original color space via a de-gamma correction process, so as to obtain frame data in the linear original color space; mapping the frame data in the linear original color space to a linear target color space, so as to obtain frame data in the linear target color space; and performing a gamma correction process on the frame data in the linear target color space by using a target gamma coefficient, so as to obtain frame data in a target color space.

13 Claims, 5 Drawing Sheets

(51) Int. Cl.
  *G06T 7/40* (2017.01)
  *G06T 7/90* (2017.01)
  *G09G 3/20* (2006.01)
  *G09G 5/02* (2006.01)
  *G09G 5/06* (2006.01)
  *H04N 1/60* (2006.01)

(52) U.S. Cl.
  CPC ............ *G09G 2320/0276* (2013.01); *G09G 2320/0666* (2013.01); *G09G 2320/0673* (2013.01); *G09G 2340/06* (2013.01); *G09G 2360/18* (2013.01); *H04N 1/6002* (2013.01)

(56) References Cited

U.S. PATENT DOCUMENTS

| | | |
|---|---|---|
| 2006/0208983 A1 | 9/2006 | Lee |
| 2008/0007565 A1 | 1/2008 | Nogawa |
| 2010/0214310 A1 | 8/2010 | Kuwahara |
| 2011/0007088 A1 | 1/2011 | Lg |
| 2011/0057963 A1 | 3/2011 | Lee |
| 2011/0304713 A1* | 12/2011 | Tardif .................. G06F 3/1423 348/54 |
| 2012/0306905 A1 | 12/2012 | Kim |

FOREIGN PATENT DOCUMENTS

| | | |
|---|---|---|
| CN | 1754186 A | 3/2006 |
| CN | 1755791 A | 4/2006 |
| CN | 101093656 A | 12/2007 |
| CN | 101107645 A | 1/2008 |
| CN | 101751868 A | 6/2010 |
| CN | 102110429 A | 6/2011 |
| CN | 103559870 A | 2/2014 |
| CN | 103763538 A | 4/2014 |
| CN | 104601971 A | 5/2015 |
| CN | 104853171 A | 8/2015 |
| EP | 1981287 A2 | 10/2008 |
| JP | H9-200790 A | 7/1997 |
| JP | 2005303989 A | 10/2005 |
| JP | 2006129437 A | 5/2006 |
| JP | 2006163067 A | 6/2006 |
| JP | 2008016962 A | 1/2008 |
| JP | 2008067343 A | 3/2008 |
| JP | 2010187414 A | 8/2010 |
| JP | 20100199659 A | 9/2010 |
| KR | 10-2008-0003737 A | 1/2008 |
| RU | 2523028 C2 | 7/2014 |
| WO | 2013054728 A1 | 4/2013 |

OTHER PUBLICATIONS

Office action from KIPO dated Dec. 6, 2016 for KR application 10-2016-7007427.
Office action from JPO dated Apr. 18, 2017 for JP application 2016-567123.
Office action dated Oct. 17, 2016 for RU application No. 2016111924.
International search report and written opinion of PCT application No. PCT/CN2015/093406.
First office action from SIPO dated Apr. 6, 2016 for CN application No. 201510020420.0.
Second office action from SIPO dated Nov. 18, 2016 for CN application No. 201510020420.0.

\* cited by examiner

COLOR ADJUSTMENT METHOD AND DEVICE

CROSS-REFERENCE TO RELATED APPLICATION

This application is based on and claims priority to Chinese Patent Application Serial No. 201510020420.0, filed with the State Intellectual Property Office of P. R. China on Jan. 15, 2015, and Chinese Patent Application Serial No. 201410856684.5, filed with the State Intellectual Property Office of P. R. China on Dec. 31, 2014, the entire contents of which are incorporated herein by reference.

FIELD

The present disclosure relates to a computer graphics field, and more particularly, to a color adjustment method and a color adjustment device.

BACKGROUND

With the development of display technologies, displays of mobile devices such as cell phones and tablet PCs may display more and more saturated colors, which is called a wide color gamut range in terminology.

Since displays of different manufacturers with different specifications may reach different color gamut ranges, different results may be displayed on different displays for a same image, which is commonly called color cast. For example, if a background color of an image is light red, it is displayed redder and denser in a wide color gamut display, and it is displayed lighter in a narrow color gamut display, thus resulting in an apparent chromatic aberration.

SUMMARY

The present disclosure provides a color adjustment method and a color adjustment device.

According to a first aspect of embodiments of the present disclosure, a color adjustment method is provided. The method includes: obtaining frame data from a frame buffer; mapping the frame data from an original color space to a linear original color space via a de-gamma correction process, so as to obtain frame data in the linear original color space; mapping the frame data in the linear original color space to a linear target color space, so as to obtain frame data in the linear target color space; and performing a gamma correction process on the frame data in the linear target color space by using a target gamma coefficient, so as to obtain frame data in a target color space.

According to a second aspect of embodiments of the present disclosure, a color adjustment device is provided. The device includes: a processor; and a memory, configured to store instructions executable by the processor, in which, the processor is configured to: obtain frame data from a frame buffer; map the frame data from an original color space to a linear original color space via a de-gamma correction process, so as to obtain frame data in the linear original color space; map the frame data in the linear original color space to a linear target color space, so as to obtain frame data in the linear target color space; and perform a gamma correction process on the frame data in the linear target color space by using a target gamma coefficient, so as to obtain the frame data in a target color space.

According to a third aspect of embodiments of the present disclosure, there is provided with a non-transitory computer-readable storage medium having stored therein instructions that, when executed by a processor of a device, causes the device to perform a color adjustment method. The method includes: obtaining frame data from a frame buffer; mapping the frame data from an original color space to a linear original color space via a de-gamma correction process, so as to obtain frame data in the linear original color space; mapping the frame data in the linear original color space to a linear target color space, so as to obtain frame data in the linear target color space; and performing a gamma correction process on the frame data in the linear target color space by using a target gamma coefficient, so as to obtain frame data in a target color space.

It should be understood that, the above general description and following detail description are exemplary and explanatory, and shall not be construed to limit the present disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the invention.

DETAILED DESCRIPTION

Referring to the following descriptions and drawings, these and other aspects of the embodiments of the present disclosure will be apparent. In these descriptions and drawings, some specific approaches of the embodiments of the present disclosure are provided, so as to show some ways to perform the principle of the embodiments of the present disclosure, however it should be understood that the embodiment of the present disclosure is not limited thereby. Instead, the embodiments of the present disclosure comprise all the variants, modifications and their equivalents within the spirit and scope of the present disclosure as defined by the claims.

A target device in the present disclosure may be a cell phone, a tablet PC, an E-book reader, a MP3 (Moving Picture Experts Group Audio Layer III) player, a MP4 (Moving Picture Experts Group Audio Layer IV) player, a laptop computer, a desktop computer, etc.

A color space is used to describe colors. There are many kinds of color space, for example, RGB (Red, Green, Blue), CMY (Cyan, Magenta, Yellow), and HSV (Hue, Saturation, Value). The sRGB (standard Red, Green, Blue) color space developed by Microsoft Corporation with Hewlett-Packard Development Company, Mitsubishi Group and Seiko Epson Corporation is used as an universal color standard, and is supported by most of the target devices.

Figure 1:
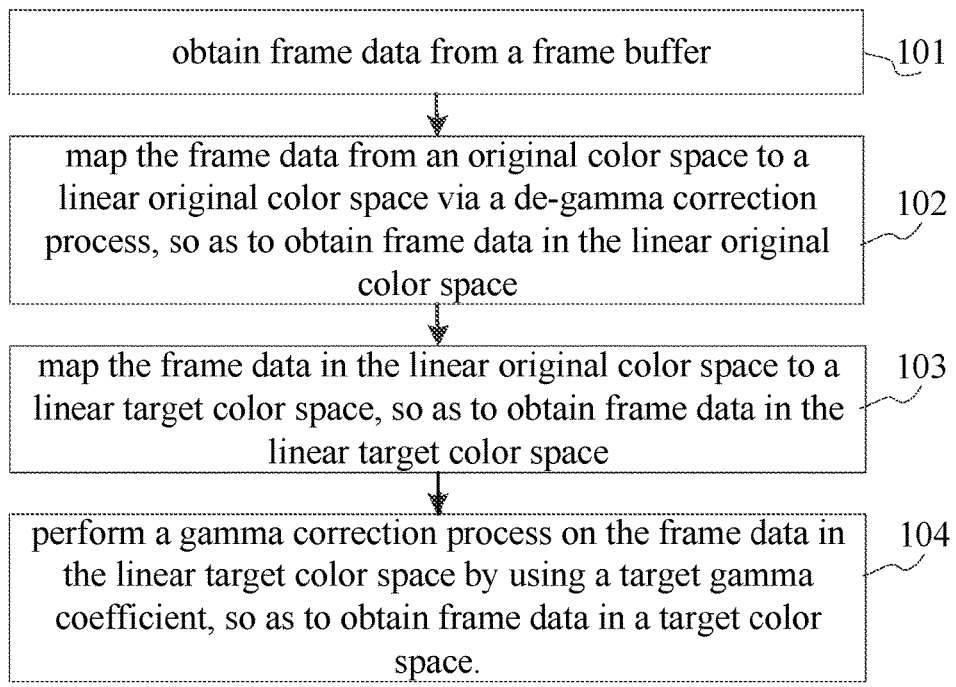
FIG. 1 is a flow chart of a color adjustment method according to an exemplary embodiment.

FIG. 1 is a flow chart of a color adjustment method according to an exemplary embodiment, which is implemented by a target device. As shown in FIG. 1, the color adjustment method comprises the following steps.

In step 101, frame data is obtained from a frame buffer.

In step 102, the frame data is mapped from an original color space to a linear original color space via a de-gamma correction process, so as to obtain frame data in the linear original color space.

In step 103, the frame data in the linear original color space is mapped to a linear target color space, so as to obtain frame data in the linear target color space.

In step 104, a gamma correction process is performed on the frame data in the linear target color space by using a target gamma coefficient, so as to obtain frame data in a target color space.

In conclusion, according to the color adjustment method provided in the present disclosure, by performing the de-gamma correction process on the frame data from the frame buffer, mapping the de-gamma corrected frame data to the linear target color space, and performing the gamma correction process on the frame data in the linear target color space to obtain the frame data in the target color space, the consistent display effect of the same frame data on different devices is realized.

Taking a CIE (Commission Internationale de L'Eclairage) xyY color space as an example of the original color space and taking a sRGB color space as an example of the target color space, the embodiment shown in FIG. 2A may be illustrated as follows.

A linear CIE xyY color space is mapped to a CIE xyY color space after a gamma correction, and a linear CIE xyY color space is obtained after performing a de-gamma correction on the CIE xyY color space.

A linear sRGB color space is mapped to a sRGB color space after a gamma correction, and a linear sRGB color space is obtained after performing a de-gamma correction on the sRGB color space.

Since different target devices may describe the frame data by using different color space, and may use different gamma coefficients to perform the gamma correction process on the frame data, a great deviation may be generated between frame data displayed on different target devices after performing respective gamma correction process on the same content to be displayed. Therefore, the method shown in FIG. 2A may be used to work on the inconsistency of displaying results of the same frame data on different devices.

Figure 2A:
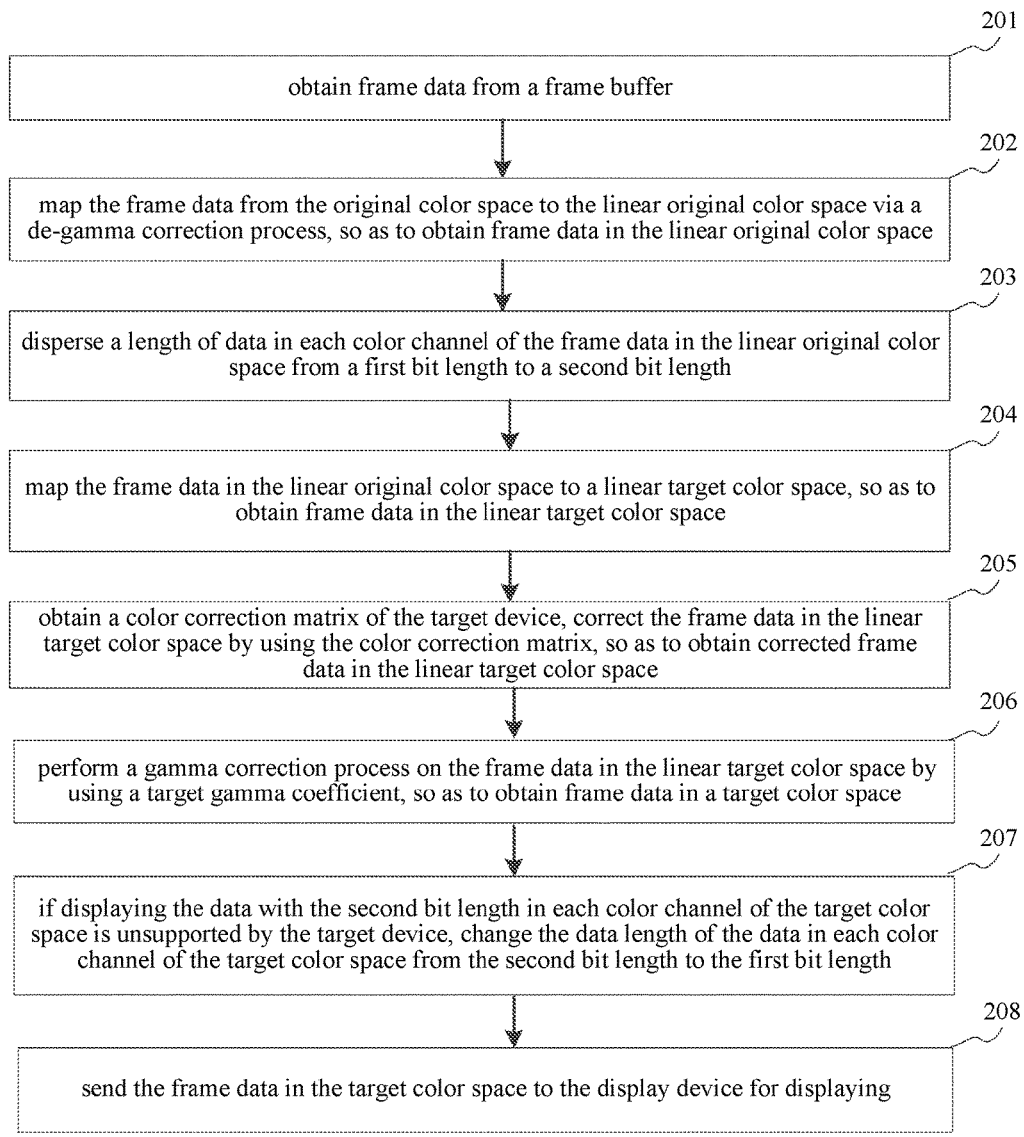
FIG. 2A is a flow chart of a color adjustment method according to another exemplary embodiment.

FIG. 2A is a flow chart of a color adjustment method according to another exemplary embodiment, in which the color adjustment method is used in a target device and realized by an application program operating in the underlying layer of the target device. As shown in FIG. 2A, the color adjustment method may comprise the following steps.

In step 201, frame data is obtained from a frame buffer.

The frame buffer of the target device is used to store the frame data to be displayed, and content to be displayed corresponding to the frame data may be an image, a video or a user interface, etc. When the target device obtains the frame data initially, a certain linear original color space may be used to describe the frame data, according to the type of the content to be displayed. For example, a linear CIE xyY color space is used to describe the frame data. Of course, there are various kinds of linear original color space, such as a linear CMY color space and a linear HSV color space, which is not limited in the present disclosure.

In order to ensure that the target device can achieve a desirable effect when displaying images, the manufacture of the target device may add a third party application in an operation system layer or an application layer of the target device, such that the target device can perform a gamma correction process on the obtained frame data and send the gamma corrected frame data to the display device for displaying the image corresponding to the gamma corrected frame data, thus ensuring the image displayed brighter or more real. Therefore, the frame data to be displayed stored in the frame buffer is usually the frame data after the gamma correction process by the target device.

In other words, after performing the gamma correction process on the frame data, the target device maps the frame data in the linear original color space to the original color space, for example, the operation system layer or the application layer of the target device maps the frame data in the linear CIE xyY color space to the CIE xyY color space via a built-in gamma correction process.

In addition, since different manufactures may have different demands on the image display effect of the target devices, different gamma coefficients may be used by different target devices to perform the gamma correction process on the frame data.

In step 202, the frame data is mapped from the original color space to the linear original color space via a de-gamma correction process, so as to obtain frame data in the linear original color space.

Since the frame data to be displayed stored in the frame buffer is the frame data after gamma correction process by the target device, a great deviation may exist in the image displayed on the display device if the gamma corrected frame data is directly mapped to the target color space and then the mapped frame data is sent by the target device to the display device. Therefore, the target device needs to map the frame data from the original color space to the linear original color space, in which the frame data in the original color space is the frame data after gamma correction, and the frame data in the linear original color space is the frame data before the gamma correction. The target color space is the color space to which the target device wishes to map the frame data.

Figure 2B:
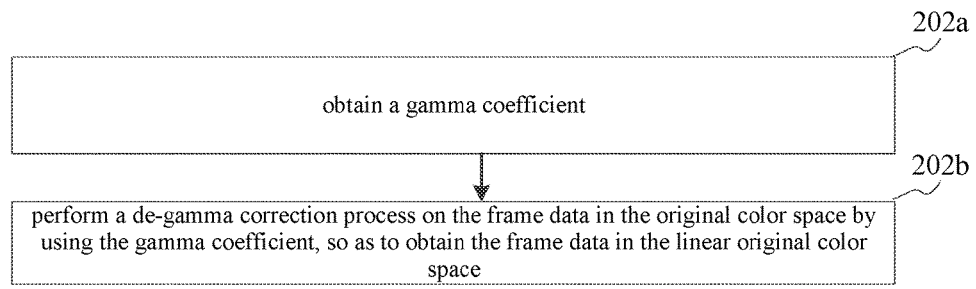
FIG. 2B is a flow chart of a de-gamma correction method according to an exemplary embodiment.

In a possible implementation, the target device may map the frame data from the original color space to the linear original color space via a de-gamma correction process, which is shown in FIG. 2B.

In step 202a, a gamma coefficient is obtained. Herein the gamma coefficient is an coefficient to be used by a target device for performing a gamma correction process on the frame data in the linear original color space at an operation system layer or at an application layer.

In step 202b, a de-gamma correction process is performed on the frame data in the original color space by using the gamma coefficient, so as to obtain the frame data in the linear original color space.

The target device usually performs the gamma correction process on the fame data in the operation system layer or in the application layer by using a third-party application. If information about respective third-party applications and a relationship list of gamma coefficients used by respective third-party applications is stored in the target device, the target device may detect the information about the third-party application used by the target device, and find the corresponding gamma coefficient from the relationship list according to the third-party application information. If there is no information about respective third-party applications and no relationship list of gamma coefficients used by respective third-party applications stored in the target device, the target device may measure the display effect via an instrument, thus obtaining the gamma coefficient.

After obtaining the gamma coefficient, the target device may perform a de-gamma correction process on the frame data at the underlying layer according to the gamma coefficient, and map the frame data from the original color space to the linear original color space, so as to obtain the frame data in the linear original color space, in which the frame data in the linear original color space is the frame data without the gamma correction.

For example, the underlying layer of the target device performs the de-gamma correction on the frame data which has been gamma corrected by the operation system layer or by the application layer, and maps the frame data from a CIE xyY color space to a linear CIE xyY color space.

In step 203, a length of data in each color channel of the frame data in the linear original color space is dispersed from a first bit length to a second bit length, wherein the second bit length is greater than the first bit length.

After mapping the frame data from the original color space to the linear original color space, the target device needs to perform a series of conversion operations on the frame data before obtaining the frame data in the target color space, in which some deviation will occur in the frame data conversion.

In order to reduce the deviation, before performing the conversion on the frame data in the linear original color space, the target device may disperse the length of the data in each color channel of the frame data from the first bit length to the second bit length, and the second bit length is greater than the first bit length. In other words, the length of data in each color channel of the frame data is increased, thus, the greater the second bit length is, the more accurate the frame data is.

The target device may increase the length of the data in each color channel of the frame data by using an interpolation method. For example, if the first bit length is 8 bit, the target device may insert 4 bit data in the data of each color channel, such that the length of the data in each color channel of the frame data is extended from 8 bit to 12 bit, thus increasing the accuracy of the frame data. For another example, if the first bit length is 8 bit, the target device may insert 8 bit data in the data of each color channel, such that the length of the data in each color channel of the frame data is extended from 8 bit to 16 bit, thus further increasing the accuracy of the frame data.

In addition, the target device may increase the length of the data in each color channel of the frame data by using other methods, which will not be elaborated herein.

In practical use, based on specific requirements, the first bit length may be greater than the second bit length, thus realizing the compression of the frame data, and reducing the calculation work of the target device.

In step 204, the frame data in the linear original color space is mapped to a linear target color space, so as to obtain frame data in the linear target color space.

After increasing the accuracy of the frame data in the linear original color space, the target device may map the frame data in the linear original color space to the linear target color space using a conversion formula, in which different conversion formulas are used for mapping the frame data in different linear original color space to the same linear target color space.

In the present disclosure, the conversion process is described as follows, by taking the linear CIE xyY color space as an example of the linear original color space, and taking the linear sRGB color space as an example of the linear target color space.

(1) the frame data in the linear CIE xyY color space is converted to a CIE XYZ three-value mode.

The target device may obtain the X value, Y value and Z value using the following conversion formula, $X=Yx/y,$ $Z=Y(1-x-y)/y.$ (2) After obtaining the X value, Y value and Z value, the X value, Y value and Z value are respectively converted to R value, G value and B value in the linear sRGB color space using a color space conversion matrix:

$$\begin{bmatrix} R_{linear} \\ G_{linear} \\ B_{linear} \end{bmatrix} = \begin{bmatrix} 3.2410 & -1.5374 & -0.4986 \\ -0.9692 & 1.8760 & 0.0416 \\ 0.0556 & -0.2040 & 1.0570 \end{bmatrix} \begin{bmatrix} X \\ Y \\ Z \end{bmatrix}$$

Parameters in the color space conversion matrix are industrial standard parameters, which may be adjusted a little by engineers according to actual requirements.

Through the conversion described above, the frame data may be mapped from the linear CIE xyY color space to the linear sRGB color space.

In step 205, a color correction matrix of the target device is obtained, and the color correction matrix is used to correct the frame data in the linear target color space, so as to obtain the corrected frame data in the linear target color space.

Taking the target color space being the sRGB color space as an example, in the sRGB color space, there may be deviations between coordinates of R, G, B and white point of the target device and coordinates of R', G', B' and white point of standard sRGB, thus a color cast may occur on the image displayed when the target device displays the frame data in the sRGB color space.

In order to reduce the color cast, the target device may correct the frame data in the linear target color space by using the color correction matrix, the color correction matrix being a deviation matrix obtained in the target color space according to deviations between color data of the target device and standard color data.

The color correction matrix may be obtained in the following way.

(1) The coordinates of R, G, B and white points of the target device are obtained in the sRGB color space.

(2) The deviation between coordinates of R, G, B and white point of the target device and coordinates of R', G', B' and white point of standard sRGB may be calculated respectively, so as to obtain the deviation matrix.

After obtaining the color correction matrix, the target device may multiple each color channel with the deviation matrix, such that the target device may display the image effect consistent with the standard sRGB image when displaying the frame data in the sRGB color space, thus eliminating the color cast.

The target device may multiple each color channel with the deviation matrix according to a formula of $$\begin{bmatrix} KRR & KGR & KBR \\ KRG & KGG & KBG \\ KRB & KGB & KBB \end{bmatrix} * \begin{bmatrix} R \\ G \\ B \end{bmatrix} = \begin{bmatrix} R' \\ G' \\ B' \end{bmatrix},$$

where, K is a degree coefficient.

It should be noted that, if in the sRGB color space, the measured coordinates of R, G, B and white points of the target device satisfy following conditions: there is no deviation between the coordinates of R and the corresponding coordinates of R' of the standard sRGB, no deviation between the coordinates of G and the corresponding coordinates of G' of the standard sRGB, no deviation between the coordinates of B and the corresponding coordinates of B' of the standard sRGB, and no deviation between the coordinates of white points and the corresponding coordinates of white points of the standard sRGB, step 205 may be omitted.

In step 206, a gamma correction process is performed on the frame data in the linear target color space by using a target gamma coefficient, so as to obtain frame data in a target color space.

For example, if the target color space is the sRGB color space, when the color space is sRGB color space, for most displays, after receiving the frame data processed by the gamma correction process with the gamma coefficient 2.2, the image effect displayed is closest to the effect of real image. Therefore, before sending the frame data to the display device, a gamma correction process with the gamma coefficient 2.2 is usually performed on the frame data.

The target device may convert respective R, and B values in the linear RGB color space to corresponding respective R, G, B values in the sRGB color space by using the following conversion formulas.

If $C_{linear}$ is $R_{linear}$, $G_{linear}$, or $B_{linear}$; $C_{srgb}$ is $R_{srgb}$, $G_{srgb}$ or $B_{srgb}$ then $R_{linear}$ may be converted to $R_{srgb}$, $G_{linear}$ may be converted to $G_{srgb}$, and $B_{linear}$ may be converted to $B_{srgb}$ using following formulas:

if $C_{linear} \geq 0.00304, C_{srgb} = 12.92 C_{linear}$;

if $C_{linear} > 0.00304, C_{srgb} = (1+a)C_{linear}^{\wedge}(1/2.4)$, where, a=0.055.

Parameters in the conversion formulas are industrial standard parameters, and may be adjusted a little by engineers according to actual requirements.

In step 207, if displaying the length of the data in each color channel of the frame data in the target color space as the second bit length is unsupported by the target device, the length of the data in each color channel of the frame data in the target color space is changed from the second bit length to the first bit length.

Since in step 203, the target device extends the length of the data in each color channel from the first bit length to the second bit length so as to reduce the deviation caused by conversion, the length of the data in each color channel of the target color space obtained by the target device may also be the second bit length.

If displaying the length of the data in each color channel of the frame data in the target color space as the second bit length is unsupported by the target device, the target device, before sending the frame data to the display device, needs to change the second bit length to the first bit length that is supported by the target device. For example, if the length of the data in each color channel of the frame data in the target color space is 12 bit, and the target device supports displaying the data with 8 bit length in each color channel of the target color space but does not support displaying the data with 12 bit length in each color channel of the target color space, then the target device may, before sending the frame data in the target color space to the display device, remove data with 4 bit length from the data in each color channel, thus changing the length of the frame data in each color channel to 8 bit that is supported by the target device.

In step 208, the frame data in the target color space is sent to the display device for displaying.

After obtaining the frame data in the target color space which is supported by the target device, the target device sends the frame data to the display device for displaying.

For the same frame data, the display effects on displays of different target devices are consistent.

Since different color space standards are used by different target devices, the same frame data are in different color spaces for different target devices. In the present disclosure, by performing the process from step 201 to step 208 on the same frame data in different color spaces, the same frame data in different original color space at different target devices may be converted to the frame data in a same target color space, and displayed on displays of different target devices with the same display effect.

Figure 2C:
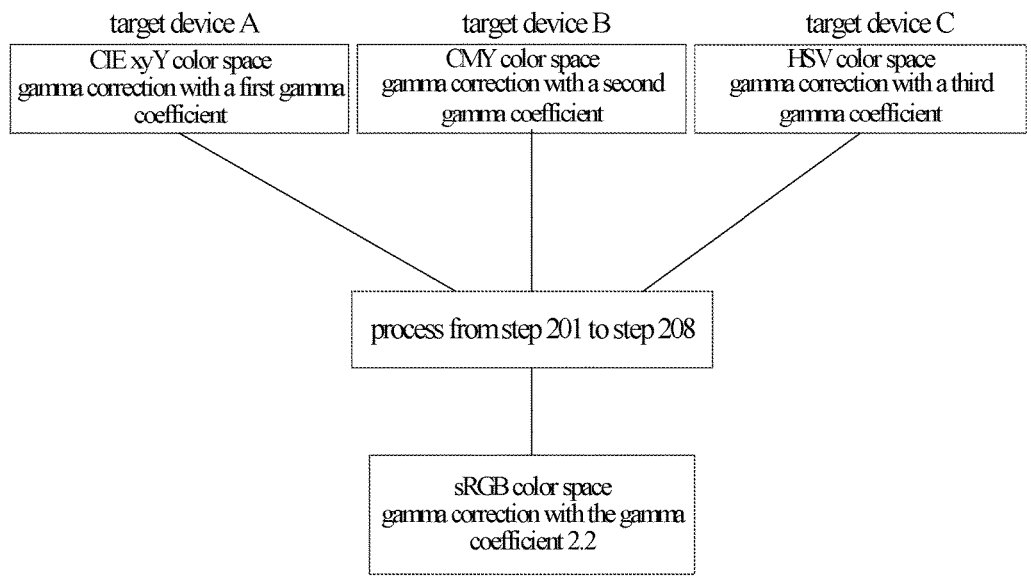
FIG. 2C is a schematic diagram of frame data conversion according to an exemplary embodiment.

As shown in FIG. 2C, which is a schematic diagram of frame data conversion according to an exemplary embodiment, for the same frame data, the corresponding color space in the frame buffer of a target device A is the CIE xyY color space, and a correction with a first gamma coefficient has been performed in advance; the corresponding color space in the frame buffer of a target device B is the CMY color space, and a correction with a second gamma coefficient has been performed in advance; the corresponding color space in the frame buffer of a target device C is the HSV color space, and a correction with a third gamma coefficient has been performed in advance. After performing the process from step 201 to step 208 on the frame data in the target device A, the target device B and target device C, the color space where the frame data is changed to be the sRGB color space, and a same gamma correction process with the same gamma coefficient 2.2 has been performed on the frame data. Thus, when the target device A, the target device B and the target device C send the frame data in the sRGB color space to their respective displays, the displays represent the same image display effect.

It should be noted that, steps 203, 205, and 207 described above are optional.

In conclusion, according to the color adjustment method provided in the present disclosure, by performing the de-gamma correction process on the frame data in the frame buffer, mapping the de-gamma corrected frame data to the linear target color space, and performing the gamma correction process on the frame data in the linear target color space to obtain the frame data in the target color space, the consistent display effect of the same frame data on different devices is realized.

In addition, according to the color adjustment method provided in the present disclosure, by dispersing the length of the data in each color channel of the frame data in the linear original color space from the first bit length to the second bit length, which is greater than the first bit length, the accuracy of the frame data is improved, thus reducing the deviation caused in subsequent conversion process.

It should be noted that, in order to improve the processing speed of the target device in converting the frame data, the target device may optimize the color correction matrix and the color space conversion matrix to one conversion matrix, and use the optimized conversion matrix to process the frame data, such that the target device needs to perform only one matrix conversion calculation to map the frame data from the linear original color space to the linear target color space and complete the correction on the frame data.

It should be noted that, in the present disclosure, algorithms such as the matrix calculation are usually realized by using software like application programs in the target device. In order to increase processing speed of the target device in converting the frame data, the target device may also use hardware to realize the algorithms such as the matrix calculation in the present disclosure, in which the hardware may be hardware with computation capacity such as a microcontroller.

It should be noted that, after mapping the frame data from respective original color spaces to the target color space via the method shown in steps 201~207, the target device may, according to the respective values of the frame data in respective original color spaces and the corresponding values of the frame data in the target color space, obtain a data conversion relationship for converting the frame data between respective color spaces and generate a look-up table according to the data conversion relationship.

As another possible implementation, the target device may use the look-up table to perform the subsequent frame data conversion process. For the frame data to be displayed, if the conversion relationship between the original color space and the target color space exists in the look-up table, the target device may directly map respective values of the frame data in the original color space to respective values of the frame data in the target color space according to the conversion relationship.

In addition, the target device may also download the look-up table from other devices, and perform the subsequent frame data conversion process according to the look-up table. In the present disclosure, there is no limit to the source of the look-up table in the target device.

Figure 3:
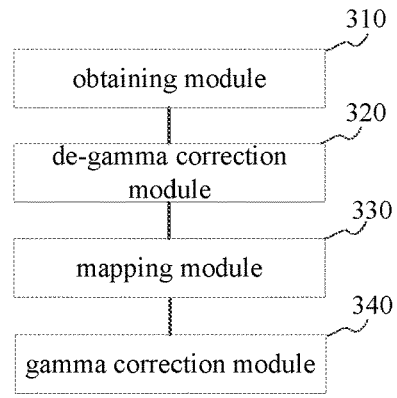
FIG. 3 is a block diagram of a color adjustment apparatus according to an exemplary embodiment.

FIG. 3 is a block diagram of a color adjustment apparatus according to an exemplary embodiment. The color adjustment apparatus is applied in a target device, and as shown in FIG. 3, the color adjustment apparatus comprises an obtaining module 310, a de-gamma correction module 320, a mapping module 330, and a gamma correction process module 340.

The obtaining module 310 is configured to obtain frame data from a frame buffer.

The de-gamma correction module 320 is configured to map the frame data obtained by the obtaining module 310 from an original color space to a linear original color space via a de-gamma correction process, so as to obtain frame data in the linear original color space.

The mapping module 330 is configured to map the frame data obtained by the de-gamma correction module 320 from the linear original color space to a linear target color space, so as to obtain frame data in the linear target color space.

The gamma correction process module 340 is configured to perform a gamma correction process on the frame data obtained by the mapping module 330 in the linear target color space by using a target gamma coefficient, so as to obtain frame data in a target color space.

In conclusion, according to the color adjustment apparatus provided in the present disclosure, by performing the de-gamma correction process on the frame data in the frame buffer, mapping the de-gamma corrected frame data the linear target color space, and performing the gamma correction process on the frame data in the linear target color space to obtain the frame data in the target color space, the consistent display effect of the same frame data on different devices is realized.

Figure 4:
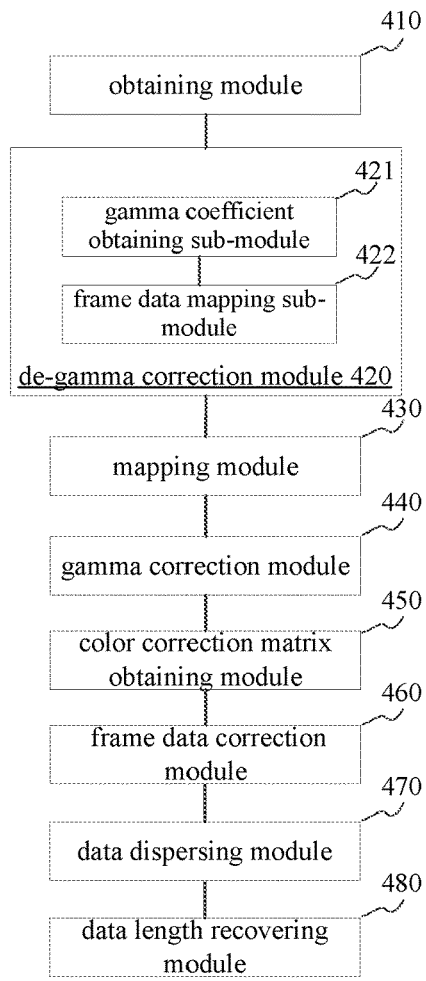
FIG. 4 is a block diagram of a color adjustment apparatus according to an exemplary embodiment.

FIG. 4 is a block diagram of a color adjustment apparatus according to an exemplary embodiment. The color adjustment apparatus is applied in a target device, and as shown in FIG. 4, the color adjustment apparatus comprises an obtaining module 410, a de-gamma correction module 420, a mapping module 430, and a gamma correction process module 440.

The obtaining module 410 is configured to obtain frame data from a frame buffer.

The de-gamma correction module 420 is configured to map the frame data obtained by the obtaining module 410 from an original color space to a linear original color space via a de-gamma correction process, so as to obtain frame data in the linear original color space.

The mapping module 430 is configured to map the frame data obtained by the de-gamma correction module 420 in the linear original color space to a linear target color space, so as to obtain frame data in the linear target color space.

The gamma correction process module 440 is configured to perform a gamma correction process on the frame data obtained by the mapping module 430 in the linear target color space by using a target gamma coefficient, so as to obtain frame data in a target color space.

Alternatively, the de-gamma correction module 420 comprises a gamma coefficient obtaining sub-module 421 and a frame data mapping sub-module 422.

The gamma coefficient obtaining sub-module 421 is configured to obtain a gamma coefficient. Herein the gamma coefficient is a coefficient to be used by a target device for performing a gamma correction process on the frame data in the linear original color space at an operation system layer or at an application layer.

The frame data mapping sub-module 422 is configured to perform a de-gamma correction process on the frame data in the original color space by using the gamma coefficient obtained by the gamma coefficient obtaining sub-module 421, so as to obtain the frame data in the linear original color space.

Alternatively, the color adjustment apparatus further comprises a color correction matrix obtaining module 450 and a frame data correction module 460.

The color correction matrix obtaining module 450 is configured to obtain a color correction matrix of the target device, the color correction matrix being a deviation matrix obtained in the target color space according to deviations between color data of the target device and standard color data.

The frame data correction module 460 is configured to correct the frame data in the linear target color space by using the color correction matrix obtained by the color correction matrix obtaining module 450, so as to obtain corrected frame data in the linear target color space.

Alternatively, the color correction apparatus further comprises a data dispersing module 470.

The data dispersing module 470 is configured to disperse data in each color channel of the linear original color space, so as to extend a length of the data in each color channel from a first bit length to a second bit length, in which the second bit length is greater than the first bit length.

Alternatively, the color adjustment apparatus further comprises a data length recovering module 480.

The data length recovering module 480 is configured to change the data length of the data in each color channel of the frame data in the target color space from the second bit length to the first bit length, if displaying the length of the data in each color channel of the frame data in the target color space as the second bit length is unsupported by the target device.

In conclusion, according to the color adjustment apparatus provided in the present disclosure, by performing the de-gamma correction process on the frame data in the frame buffer, mapping the de-gamma corrected frame data to the linear target color space, and performing the gamma correction process on the frame data in the linear target color space to obtain the frame data in a target color space, the consistent display effect of the same frame data on different devices is realized.

In addition, according to the color adjustment apparatus provided in the present disclosure, by extending the length of the data in each color channel of the frame data in the linear original color space from the first bit length to the second bit length, and the second bit length is greater than the first bit length, the accuracy of the frame data is improved, and the deviation caused in subsequent conversion process may be reduced.

With respect to the color adjustment apparatuses in the above embodiments, the specific operation modes of individual modules therein have been described in detail in the embodiments regarding the color adjustment method, which will not be elaborated herein.

In an exemplary embodiment of the present disclosure, a color adjustment apparatus is provided. The color adjustment apparatus may realize the color adjustment method provided in the present disclosure, and comprises a processor and a memory configured to store instructions executable by the processor.

The processor is configured to: obtain frame data from a frame buffer; map the frame data from an original color space to a linear original color space via a de-gamma correction process, so as to obtain frame data in the linear original color space; map the frame data in the linear original color space to a linear target color space, so as to obtain frame data in the linear target color space; and perform a gamma correction process on the frame data in the linear target color space by using a target gamma coefficient, so as to obtain frame data in a target color space.

Figure 5:
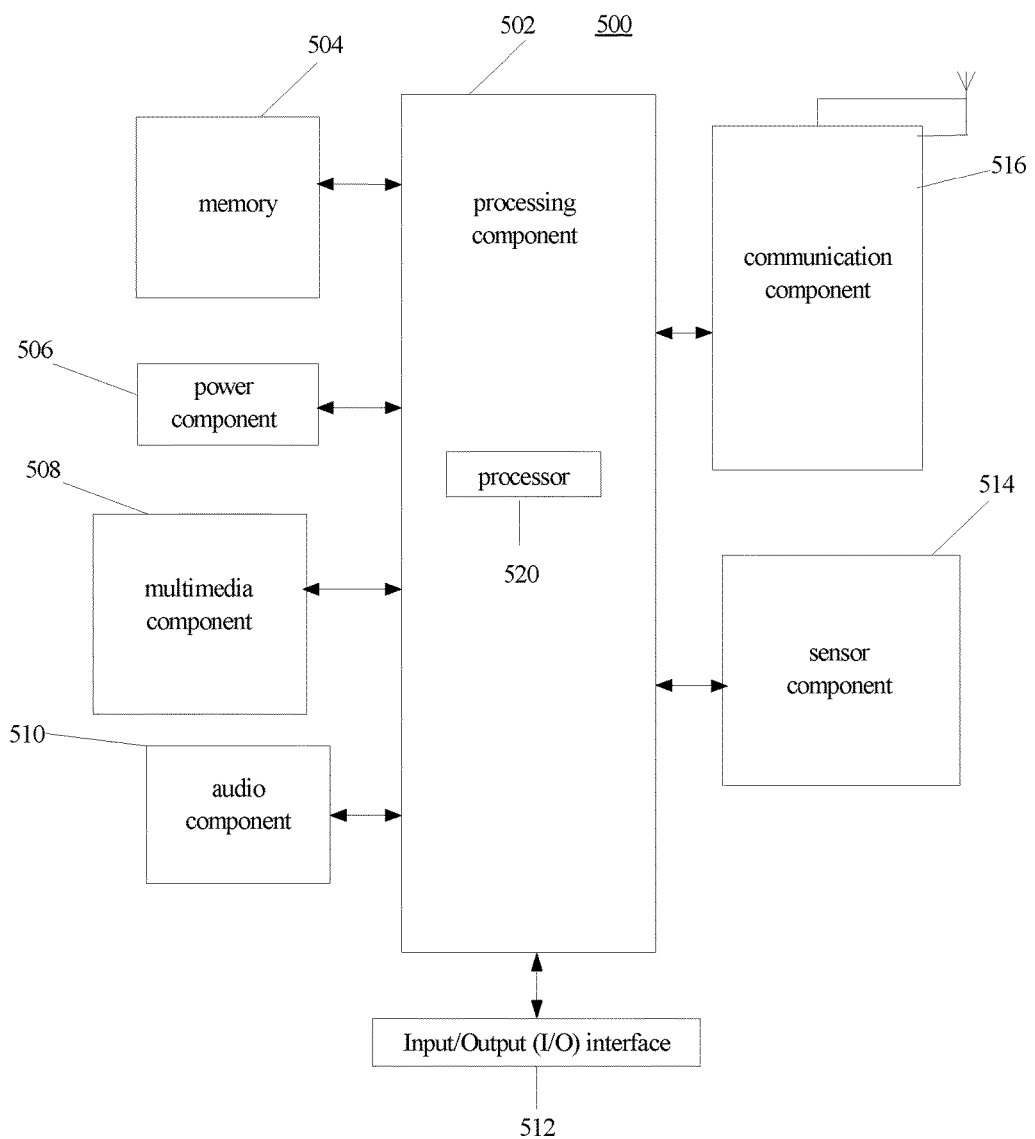
FIG. 5 is a schematic diagram of a color adjustment device according to an exemplary embodiment.

FIG. 5 is a block diagram of a color adjustment device 500 according to an exemplary embodiment. For example, the color adjustment device 500 may be a mobile phone, a computer, a digital broadcasting terminal, a messaging device, a game console, a tablet device, a fitness equipment, a Personal Digital Assistant PDA, etc. In the present disclosure, the color adjustment device 500 is the target device.

Referring to FIG. 5, the color adjustment device 500 may comprise the following one or more components: a processing component 502, a memory 504, a power component 506, a multimedia component 508, an audio component 510, an Input/Output (I/O) interface 512, a sensor component 514, and a communication component 516.

The processing component 502 typically controls overall operations of the color adjustment device 500, such as the operations associated with display, telephone calls, data communications, camera operations, and recording operations. The processing component 502 may comprise one or more processors 520 to execute instructions to perform all or part of the steps in the above described methods. Moreover, the processing component 502 may comprise one or more modules which facilitate the interaction between the processing component 502 and other components. For instance, the processing component 502 may comprise a multimedia module to facilitate the interaction between the multimedia component 508 and the processing component 502.

The memory 504 is configured to store various types of data to support the operation of the color adjustment device 500. Examples of such data comprise instructions for any applications or methods operated on the color adjustment device 500, contact data, phonebook data, messages, pictures, video, etc. The memory 504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the color correction device 500. The power component 506 may comprise a power management system, one or more power sources, and any other components associated with the generation, management, and distribution of power in the color adjustment device 500.

The multimedia component 508 comprises a screen providing an output interface between the color correction device 500 and the user. In some embodiments, the screen may comprise a liquid crystal display (LCD) and a touch panel (TP). If the screen comprises the touch panel, the screen may be implemented as a touch screen to receive input signals from the user. The touch panel comprises one or more touch sensors to sense touches, swipes, and other gestures on the touch panel. The touch sensors may not only sense a boundary of a touch or swipe action, but also sense a duration time and a pressure associated with the touch or swipe action. In some embodiments, the multimedia component 508 comprises a front camera and/or a rear camera. The front camera and the rear camera may receive external multimedia data while the color adjustment device 500 is in an operation mode, such as a photographing mode or a video mode. Each of the front camera and the rear camera may be a fixed optical lens system or have focus and optical zoom capability.

The audio component 510 is configured to output and/or input audio signals. For example, the audio component 510 comprises a microphone (MIC) configured to receive an external audio signal when the intelligent device 500 is in an operation mode, such as a call mode, a recording mode, and a voice recognition mode. The received audio signal may be further stored in the memory 504 or transmitted via the communication component 516. In some embodiments, the audio component 510 further comprises a speaker to output audio signals.

The I/O interface 512 provides an interface for the processing component 502 and peripheral interface modules, such as a keyboard, a click wheel, buttons, and the like. The buttons may comprise, but are not limited to, a home button, a volume button, a starting button, and a locking button.

The sensor component 514 comprises one or more sensors to provide status assessments of various aspects of the color correction device 500. For instance, the sensor component 514 may detect an open/closed status of the color correction device 500 and relative positioning of components (e.g. the display and the keypad of the color correction device 500). The sensor component 514 may also detect a change in position of the color correction device 500 or of a component in the color correction device 500, a presence or absence of user contact with the color correction device 500, an orientation or an acceleration/deceleration of the color correction device 500, and a change in temperature of the color correction device 500. The sensor component 514 may comprise a proximity sensor configured to detect the presence of nearby objects without any physical contact. The sensor component 514 may also comprise a light sensor, such as a CMOS or CCD image sensor, for use in imaging applications. In some embodiments, the sensor component 514 may also comprise an accelerometer sensor, a gyroscope sensor, a magnetic sensor, a pressure sensor, or a temperature sensor.

The communication component 516 is configured to facilitate wired or wireless communication between the color correction device 500 and other devices. The color correction device 500 can access a wireless network based on a communication standard, such as WIFI, 2G, or 3G, or a combination thereof. In one exemplary embodiment, the communication component 516 receives a broadcast signal or broadcast associated information from an external broadcast management system via a broadcast channel. In one exemplary embodiment, the communication component 516 further comprises a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the color adjustment device 500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium comprising instructions, such as the memory 504 comprising instructions. The above instructions are executable by the processor 520 in the color adjustment device 500, for performing the above-described methods. For example, the non-transitory computer-readable storage medium may be a ROM, a RAM, a CD-ROM, a magnetic tape, a floppy disc, an optical data storage device, and the like.

Other embodiments of the disclosure will be apparent to those skilled in the art from consideration of the specification and practice of the invention disclosed here. This application is intended to cover any variations, uses, or adaptations of the invention following the general principles thereof and comprising such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing form the scope thereof. It is intended that the scope of the invention only be limited by the appended claims.

What is claimed is:

1. A color adjustment method, comprising:
 obtaining frame data from a frame buffer;
 mapping the frame data from an original color space to a linear original color space via a de-gamma correction process, so as to obtain frame data in the linear original color space;
 mapping the frame data in the linear original color space to a linear target color space, so as to obtain frame data in the linear target color space;
 obtaining a color correction matrix of a target device, the color correction matrix being a deviation matrix obtained in the target color space according to deviations between color data of the target device and standard color data;
 correcting the frame data in the linear target color space by using the color correction matrix, so as to obtain corrected frame data in the linear target color space; and
 performing a gamma correction process on the corrected frame data in the linear target color space by using a target gamma coefficient, so as to obtain frame data in a target color space.

2. The color adjustment method according to claim 1, wherein mapping the frame data from the original color space to the linear original color space via the de-gamma correction process comprises:
 obtaining a gamma coefficient, wherein the gamma coefficient is to be used by a target device for performing a gamma correction process on the frame data in the linear original color space at an operation system layer or at an application layer; and
 performing the de-gamma correction process on the frame data in the original color space by using the gamma coefficient, so as to obtain the frame data in the linear original color space.

3. The color adjustment method according to claim 1, further comprising:
 dispersing a length of data in each color channel of the frame data in the linear original color space from a first bit length to a second bit length, wherein the second bit length is greater than the first bit length.

4. The color adjustment method according to claim 3, further comprising:
 if displaying the length of the data in each color channel of the frame data in the target color space as the second bit length is unsupported by a target device, changing the length of the data in each color channel of the frame data in the target color space from the second bit length to the first bit length.

5. The color adjustment method according to claim 1, wherein the target color space is a sRGB color space, and obtaining the color correction matrix of the target device comprises:
 obtaining coordinates of R, G, B and white points of the target device in the sRGB color space; and
 calculating deviations between the coordinates of R, G, B and white point of the target device and coordinates of R', G', B' and white point of standard sRGB respectively, so as to obtain the deviation matrix.

6. A color adjustment device, comprising:
 a processor; and
 a memory, configured to store instructions executable by the processor,
 wherein, the processor is configured to:
 obtain frame data from a frame buffer;
 map the frame data from an original color space to a linear original color space via a de-gamma correction process, so as to obtain frame data in the linear original color space; and
 map the frame data in the linear original color space to a linear target color space, so as to obtain frame data in the linear target color space;
 obtain a color correction matrix of a target device, the color correction matrix being a deviation matrix obtained in the target color space according to deviations between color data of the target device and standard color data;

correct the frame data in the linear target color space by using the color correction matrix, so as to obtain corrected frame data in the linear target color space; and perform a gamma correction process on the corrected frame data in the linear target color space by using a target gamma coefficient, so as to obtain the frame data in a target color space.

7. The color adjustment device according to claim 6, wherein the processor is configured to:

obtain a gamma coefficient, wherein the gamma coefficient is to be used by a target device for performing a gamma correction process on the frame data in the linear original color space at an operation system layer or at an application layer; and perform the de-gamma correction process on the frame data in the original color space by using the gamma coefficient, so as to obtain the frame data in the linear original color space.

8. The color adjustment device according to claim 6, wherein the processor is further configured to:

disperse the length of the data in each color channel of the frame data in the linear original color space from a first bit length to a second bit length, wherein the second bit length is greater than the first bit length.

9. The color adjustment device according to claim 8, wherein the processor is further configured to:

change the length of the data in each color channel of the frame data in the target color space from the second bit length to the first bit length, if displaying the length of the data in each color channel of the frame data in the target color space as the second bit length is unsupported by a target device.

10. A non-transitory computer-readable storage medium having stored therein instructions that, when executed by a processor of a device, causes the device to perform a color adjustment method, the method comprising:

obtaining frame data from a frame buffer;

mapping the frame data from an original color space to a linear original color space via a de-gamma correction process, so as to obtain frame data in the linear original color space;

mapping the frame data in the linear original color space to a linear target color space, so as to obtain frame data in the linear target color space;

obtaining a color correction matrix of a target device, the color correction matrix being a deviation matrix obtained in the target color space according to deviations between color data of the target device and standard color data;

correcting the frame data in the linear target color space by using the color correction matrix, so as to obtain corrected frame data in the linear target color space; and performing a gamma correction process on the corrected frame data in the linear target color space by using a target gamma coefficient, so as to obtain frame data in a target color space.

11. The storage medium according to claim 10, wherein mapping the frame data from the original color space to the linear original color space via the de-gamma correction process comprises:

obtaining a gamma coefficient, wherein the gamma coefficient is to be used by a target device for performing a gamma correction process on the frame data in the linear original color space at an operation system layer or at an application layer; and performing the de-gamma correction process on the frame data in the original color space by using the gamma coefficient, so as to obtain the frame data in the linear original color space.

12. The storage medium according to claim 10, wherein the method further comprises:

dispersing a length of the data in each color channel of the frame data in the linear original space from a first bit length to a second bit length, wherein the second bit length is greater than the first bit length.

13. The storage medium according to claim 12, wherein the method further comprises:

if displaying the length of the data in each color channel of the frame data in the target color space as the second bit length is unsupported by a target device, changing the length of the data in each color channel of the frame data in the target color space from the second bit length to the first bit length.

\* \* \* \* \*